(12) United States Patent
Crona

(10) Patent No.: US 10,846,946 B2
(45) Date of Patent: Nov. 24, 2020

(54) TOLLING STATION FOR TOLLING VEHICLES OF DIFFERENT CLASSES

(71) Applicant: Kapsch TrafficCom AG, Vienna (AT)

(72) Inventor: Björn Crona, Jönköping (SE)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 16/562,038

(22) Filed: Sep. 5, 2019

(65) Prior Publication Data

US 2020/0090418 A1    Mar. 19, 2020

(30) Foreign Application Priority Data

Sep. 14, 2018    (EP) ..................................... 18194462

(51) Int. Cl.
| | | |
|---|---|---|
| *G07B 15/06* | (2011.01) | |
| *G08G 1/015* | (2006.01) | |
| *H04W 4/44* | (2018.01) | |
| *G06K 9/00* | (2006.01) | |

(52) U.S. Cl.
CPC ....... *G07B 15/063* (2013.01); *G06K 9/00771* (2013.01); *G08G 1/015* (2013.01); *H04W 4/44* (2018.02); *G06K 2209/15* (2013.01)

(58) Field of Classification Search
CPC .... G07B 15/063; G07B 15/06; G07B 13/045; G08G 1/015; H04W 4/44; G06K 9/00771; G06K 2209/15; G07C 5/008; G07C 5/0808
See application file for complete search history.

(56) References Cited

U.S. PATENT DOCUMENTS

| | | | | |
|---|---|---|---|---|
| 6,042,008 A * | 3/2000 | Ando | ................... | G07B 15/063 |
| | | | | 235/375 |
| 6,140,941 A | 10/2000 | Dwyer et al. | | |
| 6,892,942 B1 * | 5/2005 | Widl | ..................... | G08G 1/017 |
| | | | | 235/384 |
| 7,136,828 B1 * | 11/2006 | Allen | ..................... | G08G 1/017 |
| | | | | 705/13 |
| 7,324,015 B1 | 1/2008 | Allen et al. | | |
| 7,734,500 B1 * | 6/2010 | Allen | ..................... | G08G 1/015 |
| | | | | 705/13 |
| 8,331,621 B1 * | 12/2012 | Allen | ..................... | G08G 1/015 |
| | | | | 382/104 |

(Continued)

FOREIGN PATENT DOCUMENTS

| | | | |
|---|---|---|---|
| EP | 0928473 B1 | 8/2003 | |
| WO | 9607168 A1 | 3/1996 | |

OTHER PUBLICATIONS

Extended European Search Report received for European Patent Application No. 18194462.0, dated Mar. 20, 2019, 6 pages.

*Primary Examiner* — An T Nguyen
(74) *Attorney, Agent, or Firm* — Fiala & Weaver P.L.L.C.

(57) ABSTRACT

A tolling station for tolling vehicles of different classes comprises an entrance section, a tolling section, and an intermediate section. The tolling section comprises a gate for each tolling lane and the entrance section comprises at least one classification device to link an identifier to a determined class. The tolling station further comprises a tracking device configured to track vehicles moving through the intermediate section and to pass the vehicle's identifier to the respective gate the vehicle exits to. Each gate is configured to toll, or let pass, a vehicle based on the class linked to the identifier.

10 Claims, 1 Drawing Sheet

(56) References Cited

U.S. PATENT DOCUMENTS

| | | | | |
|---|---|---|---|---|
| 2002/0105440 | A1* | 8/2002 | Bostrom | G07B 15/063 340/928 |
| 2002/0140924 | A1* | 10/2002 | Wangler | G08G 1/04 356/28 |
| 2005/0046598 | A1* | 3/2005 | Allen | G08G 1/015 340/933 |
| 2009/0115638 | A1* | 5/2009 | Shankwitz | G08G 1/161 340/988 |
| 2009/0174575 | A1* | 7/2009 | Allen | G08G 1/017 340/933 |
| 2012/0323690 | A1* | 12/2012 | Michael | G01C 21/3461 705/14.58 |
| 2013/0006725 | A1* | 1/2013 | Simanek | G07B 15/063 705/13 |
| 2014/0036076 | A1* | 2/2014 | Nerayoff | G06K 9/00791 348/148 |
| 2014/0085110 | A1* | 3/2014 | Scofield | G07B 15/04 340/932.2 |
| 2014/0176679 | A1* | 6/2014 | Lehning | G06K 9/00785 348/46 |
| 2015/0049914 | A1* | 2/2015 | Alves | G06K 9/033 382/105 |
| 2015/0070501 | A1 | 3/2015 | Ooi | |
| 2016/0180604 | A1* | 6/2016 | Wilson | G07B 15/063 705/4 |
| 2016/0203464 | A1* | 7/2016 | Fustes | G07B 15/063 705/13 |
| 2017/0113619 | A1* | 4/2017 | Boehm | G07C 9/00309 |
| 2017/0323505 | A1* | 11/2017 | Gaddam | H04L 63/08 |
| 2017/0330389 | A1* | 11/2017 | Shin | G07B 15/00 |
| 2020/0134931 | A1* | 4/2020 | Gillies | G08G 1/056 |

* cited by examiner

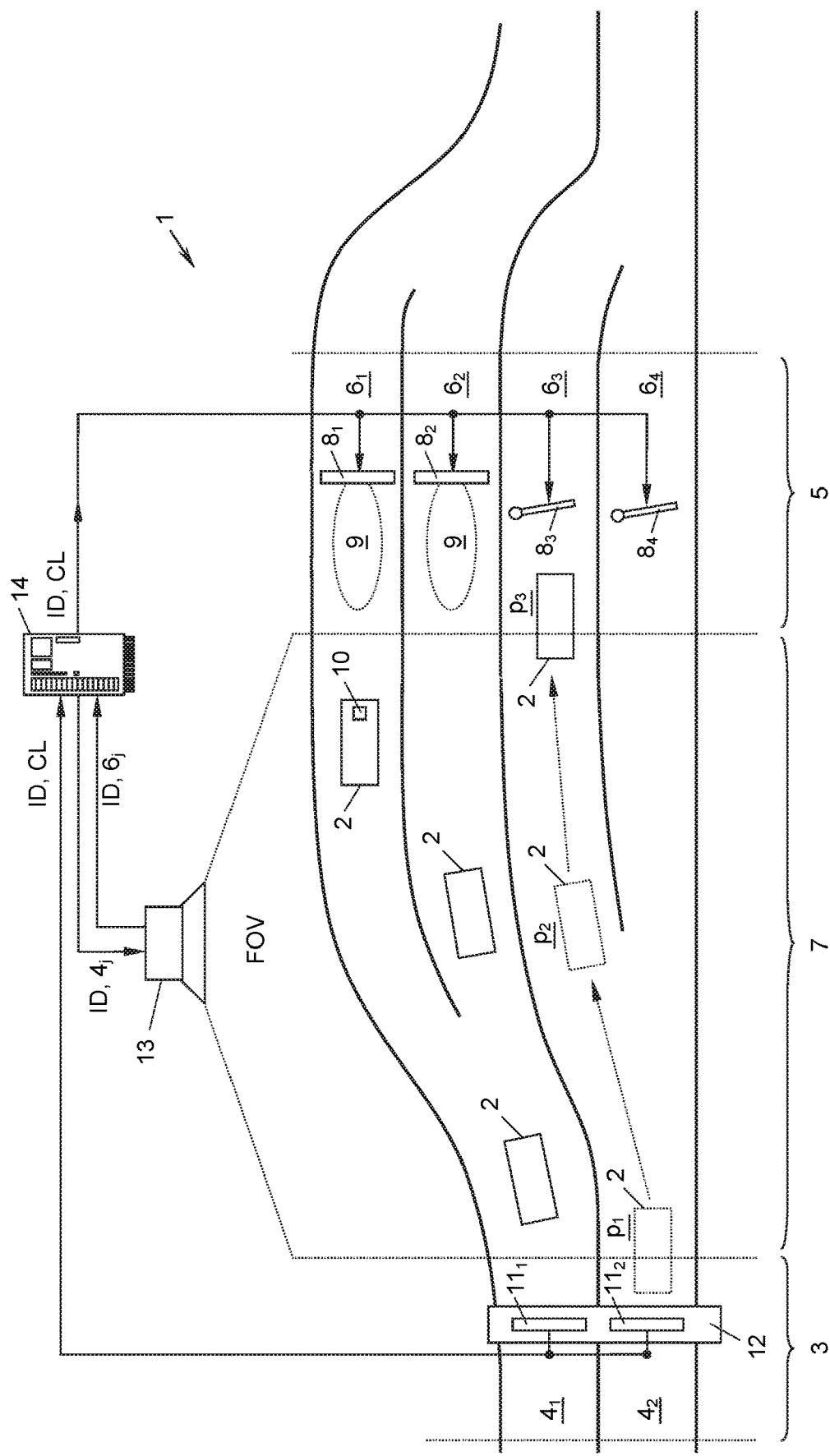

TOLLING STATION FOR TOLLING VEHICLES OF DIFFERENT CLASSES

CROSS-REFERENCE TO RELATED APPLICATION(S)

This application claims priority to European Patent Application No. 18 194 462.0, filed on Sep. 14, 2018, the entirety of which is incorporated by reference herein.

BACKGROUND

Technical Field

The present disclosure relates to a tolling station for tolling vehicles of different classes, comprising an entrance section having a first number of lanes, a tolling section having a second number of lanes that is higher than the first, and an intermediate section lying between the entrance section and the tolling section, wherein the intermediate section provides a junction of lanes between the entrance lanes and the tolling lanes, and wherein the tolling section comprises a gate for each tolling lane, each gate being configured to toll, or let pass or not, a vehicle based on its class.

Background Art

Such tolling stations are known in the art, see for example U.S. Pat. No. 7,324,051 B1, to toll vehicles, e.g., on a highway. To perform the tolling, the vehicles have to be stopped or at least slowed down to levy the toll, for example by means of collecting cash from the driver, performing a debit or credit card transaction, a license plate number (LPN) reading for LPN charging, or a wireless transaction with an onboard-unit carried by the vehicle. Because stopping or slowing down vehicles causes considerate problems for the otherwise free-flowing traffic, the two or three lanes of the highway split up into eight lanes, for example. This widened area of the highway is commonly also called toll plaza or tolling section as used hereinafter.

For levying the toll, on each lane of the highway there is implemented a tolling gate, for example, which comprises on the one hand a classification device for determining the class of the passing vehicle. The reasoning for this is that for example lorries, freight vehicles, or commercial vehicles in general pay a different toll than passenger cars. On the other hand, the tolling gate comprises a tolling booth to levy said toll as explained above.

Such tolling solutions require a high investment cost because equipment has to be provided for each lane separately.

BRIEF SUMMARY

It is therefore an object of the present disclosure to provide a tolling station for tolling vehicles of different classes that requires less investment cost.

This aim is achieved by means of a tolling station of the type mentioned in the introduction, in which the entrance section comprises at least one classification device configured to determine at least a class of a vehicle travelling on one of its lanes and assign an identifier to said vehicle, and link the identifier to the determined class; and the tolling station comprises a tracking device configured to:

for a vehicle entering the intermediate section from the entrance section, obtain the identifier of said vehicle from the corresponding classification device, track said vehicle moving through the intermediate section, for said vehicle exiting the intermediate section to the tolling section, pass the vehicle's identifier to the respective gate the vehicle exits to;

wherein each gate is configured to toll, or let pass or not, a vehicle based on the class linked to the identifier of this vehicle.

By means of installing the classification device/s upstream of the traffic flow and providing the tracking device, less classification devices, e.g., cameras and transceivers, have to be used than in the state of the art, where classification devices have to be implemented for every lane of the tolling station. The disclosed solution is based on the finding that levying the toll and/or enforcing on the one hand and determining the class of the vehicle on the other hand may have different processing times, i.e., while for levying the toll vehicles may need to be stopped or slowed down, the class of vehicles can be determined in free flowing traffic.

The tracking device provides the necessary technical means for implementing the correlation between the determined class and the gate at which the toll is levied. This is achieved by means of assigning an identifier to said vehicle and linking the identifier to the determined class.

In one embodiment, the classification device is configured to determine the class from a height profile of a passing vehicle by means of a laser scanner. This is particularly useful because laser scanners have a scanning time that is sufficiently low such that this technique can be employed in a free-flowing traffic. The classification devices could also determine the number of axles, for example by means of a laser scanner, too, to detect the class. Other alternatives could be mechanical sensors implemented in the lanes to determine a weight or a number of axles, from which again the class could be determined.

Optionally, the classification device is configured to also determine a license plate number, vehicle information by means of a wireless communication with an onboard unit of the vehicle, weight and/or length of the vehicle, and the gate is configured to toll based on at least one of the determined information in addition to the class. By means of this, even more information about the vehicle can be gathered for tolling before the tolling gate is reached. The amount of toll can thus further be customised while investment cost can stay low.

Further optionally, the tracking device and the classification devices are mounted on a common support at the entrance section, such as a gantry, cantilever or pole. This allows the support to be pre-manufactured and pre-calibrated before it is installed in the tolling station, which reduces installation time and cost.

In an embodiment, the identification is a random number unique for all vehicles within the tolling station. As an alternative to random numbers, sequential numbers could be used for the identification, too, or license plate numbers if read by the classification device.

The gate can be configured in any number of ways. In a first embodiment, the gate is a DSRC (Dedicated Short Range Communication) beacon configured to wirelessly toll an onboard unit of the vehicle. Here, the gate could comprise means for stopping the vehicle, for example a barrier, after a DSRC transaction has failed, or simply a camera or license plate number detector for enforcing sanctions without stopping the vehicle and thus the traffic.

Alternatively, the gate is a physical barrier that is configured to open after tolling. In this case, tolling could be performed by means of a cash, credit card, or debit card transaction, in which case the barrier opens after a successful transaction.

Optionally, the tracking device comprises a camera and is configured to track vehicles by means of image recognition. The image of the camera could be in the visible, infrared or thermal range. Other tracking implementations could be utilised too, for example by means of lidar or radar that track the vehicles.

BRIEF DESCRIPTION OF THE DRAWINGS/FIGURES

The present disclosure shall now be explained in more detail below on the basis of exemplary embodiments thereof with reference to the accompanying drawing, in which the single FIG. 1 shows a tolling station according to the present disclosure in a top view.

DETAILED DESCRIPTION

FIG. 1 shows a tolling station 1 for tolling vehicles 2 of different classes CL. The tolling station 1 comprises an entrance section 3 having a first number I of lanes $4_i$ (i=1, 2, . . . , I), a tolling section 5 having a second number J of lanes $6_j$ (j=1, 2, . . . , J), with J>I, and an intermediate section 7 lying between the entrance section 3 and the tolling section 5. The intermediate section 7 provides a junction of lanes between the entrance lanes $4_i$ and the tolling lanes $6_j$.

The vehicles 2 enter the tolling station 1 through the entrance section 3, traverse it through the intermediate section 7, and exit it through the tolling section 5. For example, in FIG. 1 a vehicle 2 can be seen at a first position $p_1$ entering the intermediate section 7 from the entrance section 3, at a second position $p_2$ while moving through the intermediate section 7 and at a third position $p_3$ exiting the intermediate section 7, towards the tolling section 5. Therefore, it can be said that the entrance section 3 lies upstream of the tolling section 5 in the flow of traffic.

The entrance section 3 is a part of a highway, freeway, country road, or the like (in the following referred to as "highway" for brevity). The number I of the lanes $4_i$ of the entrance section 3 thus equals the lanes of the highway.

The tolling station 1 serves to toll, or—in simple embodiments—just let pass or not pass, the vehicles 2 based on their class CL. The class CL can be based on any feature of a vehicle 2, e.g., the vehicle's length, width, height, weight, type, number of axles, presence of trailer, purpose of use, emissions, number of passengers etc. and any combination of these. Because the vehicles 2 have to be stopped or at least slowed down for tolling, the number I of lanes $4_i$ of the highway is increased to a number J of lanes $6_j$ in the tolling section 5 to impact the overall flow of traffic as little as possible. Typically, the number J of lanes $6_j$ in the tolling section 5 is two to three times higher than the number I of lanes $4_i$ of the entrance section 3.

For levying toll on the vehicles 2, each lane $6_j$ of the tolling section 5 is equipped with a gate $8_j$ to toll (or let pass or not) a passing vehicle 2 based on its class CL. The gate $8_j$ can be a DSRC radio beacon with a radio coverage area 9 as shown for the upper two gates $8_1$, $8_2$. The DSRC radio beacons here levy the toll by wirelessly communicating with onboard units 10 carried by the vehicles 2, for example by means of deducting a charge from an electronic wallet in the onboard unit 10. Alternatively, the onboard unit 10 could communicate a credit card number, debit card number, or bank account number to the DSRC radio beacon such that the charge could be billed for this credit card number, debit card number, or bank account number. In this case, the vehicles 2 do not have to be stopped at all. However, most DSRC radio beacons require the vehicles 2 to drive at a maximum speed such that communications with the onboard unit 10 can be performed reliably. Non-paying vehicles 2 could be stopped by means of a closing barrier or simply prosecuted by means of reading the vehicle's license plate number or taking a picture of the violating vehicle 2 with a camera of the gate $8_j$ or the entrance section 3.

Alternatively or additionally, physical barriers that only open after (manually or automatically) levying a toll could be employed as shown for the two bottom gates $8_3$ and $8_4$. The gates $8_3$, $8_4$ could in this case be manned or unmanned and accept cash, debit cards, or credit cards. Other types of gates $6_j$ could be used, too.

To determine the class CL of the vehicles 2 before they enter the tolling section 5, the entrance section 3 comprises one or more classification devices $11_i$, each for one or more entrance lanes $4_i$. The classification devices $11_i$ could be cameras or laser scanners, for example, that measure the height profile and/or number of axles of the passing vehicle 2. From the height profile and/or number of axles, the class CL of the vehicles 2 can be determined, such as "personal vehicle", "commercial vehicle with 3 axles", "commercial vehicle with 4 axles", etc.

More generally, the classification device $11_i$ measures a feature of the passing vehicle 2, from which feature the class CL can be determined. The vehicle's feature determined by the classification device $11_i$ is thus not restricted to height profile or number of axles but could also be a license plate number, a vehicle information read by means of a camera or a wireless communication with an onboard unit of the vehicle, a weight and/or length of the vehicle 2, measured by mechanical and/or optical sensors, treadles, light barriers etc. Generally, the vehicle's feature/s determined by the classification device $11_i$ can be, e.g., the vehicle's length, width, height, weight, type, number of axles, presence of trailer, purpose of use, emissions, number of passengers etc. and any combination of these. Any or any combination of those features can be used to determine the class CL. If features have been measured that are not used for determining the class CL, they can also be forwarded to the respective gate $8_j$ and be used for tolling.

Optionally, the classification device $11_i$ can provide an image of the vehicle 2 to the respective tolling gate $8_j$ for enforcement purposes. The classification devices $11_i$ could be mounted on a common support 12, which spans over the entrance section 3, a cantilever, one or more poles etc.

For forwarding the determined class CL from the classification device $11_i$, under which a certain vehicle 2 has passed, to the correct gate $8_j$ this vehicle 2 reaches, the tolling station 1 further comprises a tracking device 13. The tracking device 13 could be mounted in any of the entrance section 3 (for example on the gantry 12), intermediate section 7, or tolling section 5. The tracking device 13 has a field of view FOV, which covers the intermediate section 7 to track vehicles 2, i.e., to determine from which entrance lane $4_i$ a certain vehicle 2 enters the intermediate section 7 and at which tolling lane $6_j$ this vehicle 2 exits the intermediate section 7, as explained in detail below.

The tracking device 13 could for example be one or more cameras and track vehicles 2 by means of image recognition. If multiple cameras are used, the individual pictures or videos could be merged. Alternatively, the tracking device 13 could be a laser device, for example an infrared laser, for tracking vehicles 2, or a laser scanner to scan the entire intermediate section 7 for objects and track their movement. The tracking device 13 can have capabilities to track multiple vehicles 2 in its field of view FOV in parallel. Alternatively, multiple tracking devices 13 could be employed that each track a single vehicle 2.

The tracking device/s 13 is/are connected to the classification devices $11_i$, and the gates $8_j$, e.g., via a network. In the example of FIG. 1, a central computer 14 manages data input and output of said three entities $11_i$, 13, and $8_j$ to facilitate storing and distributing data.

For implementing said tracking functionality in the tolling station 1, any of the one or more classification devices $11_i$ assigns an identifier ID to a vehicle 2 of which it has determined the class CL and links the identifier ID to the determined class CL. The link between the identifier ID and the class CL could be stored in a database of the computer 14, for example. Furthermore, the identifier ID could be stored in the computer 14 assigned to the entrance lane $4_i$, (or corresponding classification device $11_i$) of the vehicle 2, optionally together with a timestamp.

The identifier ID can be a random number unique for all vehicles 2 within the tolling station 1 and thus be generated by each classification device $11_i$, individually or by the computer 14, which could distribute sets of usable identifiers ID to each classification device $11_i$, for example. Alternatively, the identifiers ID could be fixed serial numbers increasing with each passing vehicle 2. Further alternatively, the classification device $11_i$, could read a license plate number of each vehicle 2 and use the license plate number as the identifier ID. Another alternative could be to read out an onboard unit 10 of the vehicle 2 and use a number indicated by the onboard unit 2, e.g., a serial number of the onboard unit 10, as the identifier ID.

As soon as (or even before) a vehicle 2 enters the intermediate section 7 from the entrance section 3, the tracking device 13 obtains the identifier ID of said vehicle 2 from the corresponding classification device $11_i$, either directly therefrom or via the computer 14, e.g., by matching a detected vehicle 2 with an entrance lane $4_i$, and/or timestamp stored in the computer 14. The tracking device 13 then tracks said vehicle 2 moving through the intermediate section 7 while having the corresponding identifier ID assigned to that vehicle 2. When said vehicle 2 exits the intermediate section 7 to the tolling section 5, the tracking device 13 passes the vehicle's identifier ID to the respective gate $8_j$ the vehicle 2 exits to.

Passing the identifier ID from the tracking device 13 to the gate $8_j$ can be done either directly or indirectly via storing a relationship between the identifier ID and the tolling lane $6_j$ (and/or corresponding gate $8_j$) the vehicle 2 exists to in the computer 14, optionally together with a timestamp. This relationship could then be fetched by the gate $8_j$ upon detecting a vehicle 2 such that the identifier ID is passed indirectly to the gate $8_j$.

As soon as the respective gate $8_j$ has obtained the identifier ID of an arriving vehicle 2, it can determine its class CL, e.g., by looking up the link between identifier ID and determined class CL. Alternatively, the class CL could already have been passed along with the identifier ID to the gate $8_j$ by the tracking device 13. Then, the gate $8_j$ can toll, or let pass or not, the vehicle 2 by means of the class CL of the vehicle 2, optionally also by means of the further features determined by the classification device/s $11_i$, which could also have been linked to the identifier ID in the database of the computer 14. The classification device/s $11_i$ can also send or provide an image of the vehicle 2 under the identifier ID to the respective tolling gate $8_j$, e.g., for enforcement purposes.

CONCLUSION

The present disclosure is not restricted to the specific embodiments described in detail herein, but encompasses all variants, combinations, and modifications thereof that fall within the framework of the appended claims.

What is claimed is:

1. A tolling station for tolling vehicles of different classes, comprising:
   an entrance section having a first number of lanes, a tolling section having a second number of lanes that is higher than the first, and an intermediate section lying between the entrance section and the tolling section;
   wherein the intermediate section provides a junction of lanes between the entrance lanes and the tolling lanes;
   wherein the tolling section comprises a gate for each tolling lane, each gate being configured to toll, or let pass or not, a vehicle based on its class;
   wherein the entrance section comprises at least one classification device configured to determine at least a class of a vehicle travelling on one of its lanes and assign an identifier to said vehicle, and link the identifier to the determined class;
   wherein the tolling station comprises a tracking device configured to:
     for a vehicle entering the intermediate section from the entrance section, obtain the identifier of said vehicle from the corresponding classification device,
     track said vehicle moving through the intermediate section,
     for said vehicle exiting the intermediate section to the tolling section, pass the vehicle's identifier to the respective gate the vehicle exits to; and
   wherein each gate is configured to toll, or let pass or not, a vehicle based on the class linked to the identifier of this vehicle.

2. The tolling station according to claim 1, wherein the entrance section comprises a classification device for each entrance lane.

3. The tolling station according to claim 1, wherein the classification device is configured to determine the class from a height profile and/or number of axles of a passing vehicle by means of a laser scanner.

4. The tolling station according to claim 1, wherein the classification device is configured to determine the class from mechanical weight sensors in the lanes of the entrance section.

5. The tolling station according to claim 1, wherein the classification device is configured to also determine a license plate number or vehicle information by means of a wireless communication with an onboard unit of the vehicle,
   and the gate is configured to toll based on at least one of the determined information in addition to the class.

6. The tolling station according to claim 1, wherein the tracking device and the classification devices are mounted on a common support at the entrance section.

7. The tolling station according to claim 1, wherein the identification is a random number unique for all vehicles within the tolling station.

8. The tolling station according to claim 1, wherein the gate is a DSRC beacon configured to wirelessly toll an onboard unit of the vehicle.

9. The tolling station according to claim 1, wherein the gate is a physical barrier that is configured to open after tolling.

10. The tolling station according to claim 1, wherein the tracking device comprises a camera and is configured to track vehicles by means of image recognition.

\* \* \* \* \*